United States Patent [19]

Ange et al.

[11] 4,307,514
[45] Dec. 29, 1981

[54] BORE DIAMETER MEASUREMENT GAGE

[75] Inventors: Colin K. Ange, Charlotte; Marshall J. Rouse, Waxhaw, both of N.C.

[73] Assignee: Westinghouse Electric Corp., Pittsburgh, Pa.

[21] Appl. No.: 90,371

[22] Filed: Nov. 1, 1979

[51] Int. Cl.$^3$ .............................................. G01B 7/12
[52] U.S. Cl. .................................. 33/178 E; 33/149 J
[58] Field of Search ............. 33/178 R, 178 F, 178 E, 33/149 R, 149 B, 149 J, 150

[56] References Cited

U.S. PATENT DOCUMENTS

| | | | |
|---|---|---|---|
| 518,638 | 4/1894 | Weston | 33/178 R |
| 2,302,355 | 11/1942 | Sumner | 33/178 R |
| 3,081,548 | 3/1963 | Schwartz | 33/149 R |
| 3,177,938 | 4/1965 | Roussin | 33/178 F |
| 3,349,498 | 10/1967 | Oliver et al. | 33/178 F |
| 3,685,158 | 8/1972 | Planche | 33/178 F |
| 3,772,794 | 11/1973 | Hopler, Jr. | 33/178 F |
| 3,939,568 | 2/1976 | Gonos et al. | 33/178 F |
| 4,121,345 | 10/1978 | Roesner | 33/178 F |

FOREIGN PATENT DOCUMENTS 1228070  11/1966  Fed. Rep. of Germany .... 33/178 F

Primary Examiner—Willis Little
Attorney, Agent, or Firm—G. H. Telfer

[57] ABSTRACT

An apparatus for measuring the bore diameter of a hollow member whose bore diameter can change in the axial direction. The bore diameter measuring apparatus includes a probe portion, means for inserting the probe portion in the bore, and means for converting a signal supplied thereto by the probe to a bore diameter indication. The probe portion has a housing structure, a plurality of legs which are radially expandable relative to the housing structure, means for radially displacing the legs, and means for measuring the axial displacement of the radial displacing means. The legs are radially displaceable from a retracted position substantially within the radial outline of the housing structure to selected positions radially therebeyond so as to permit entry of the probe portion through a relatively small portion of the bore and expansion radially outwardly in a large portion of the bore. Probe portion legs may be displaced to suitable radial positions to accommodate changes in the rotor bore diameter size between selected axial positions of the bore.

6 Claims, 3 Drawing Figures

BORE DIAMETER MEASUREMENT GAGE

BACKGROUND OF THE INVENTION

This invention relates to measurement of bore diameters and more particularly to bore measuring devices which are capable of measuring large, gradual variations in the bore size.

A multi-legged apparatus called a star gage has historically been used to measure bore diameters. The star gage was essentially an internal micrometer which was expandable in the radial direction to meet the bore's wall. Its travel in the radial direction was limited to approximately ¼ inch and was highly dependent on operator skill for accuracy of result. Additionally, the star gage was useful only for substantially constant diameter, straight bores.

Turbines and other devices using rotatable members such as shafts are typically manufactured with straight, substantially constant diameter bores, but if a defect such as a crack or impurity inclusion is found in the rotor's bore during post manufacturing inspection thereof, the defect is often machined away by cutting into the shaft and radially enlarging the bore. To avoid stress concentrations, the bore diameter was gradually expanded in the radial direction from the normal bore to the enlarged bore so as to form a so-called "bottled bore" whose profile is suggestive of a tapered bottle outline. Measurement of such bottle bores has typically been accomplished during formation of the bottle bore by radially swinging the defect-removing cutting tool into the coincidental axis of an associated cutting machine and bore, withdrawing the cutting machine and tool from the bore, swinging the cutting tool radially outward, and measuring the distance from the axis of the cutting machine to the radially outer extent of the cutting tool. During routine shut-downs at or maintenance on rotors, turbine shafts, or other bored members, the bore diameter must be inspected and measured very accurately and compared to the post-manufactured bore diameter to give early indications of various failure modes such as impending "creep" failure. During such inspection, the cutting tool bore measurement procedure is, of course, not well suited since it is undesirable to enlarge the bore beyond that which is necessary to eradicate the defect.

At periodic intervals of operation the apparatus (such as a turbine) utilizing the bored rotor is typically shut down, disassembled, and inspected with a view toward routine and preventive maintenance. Inspection and measurement of the bore during such a shutdown is considered desirable since changes in the bore diameter provides an indication of potential future failure. The length of the shutdown must be minimized to maximize the use of the turbine and revenue obtained as a result thereof. It is thus incumbent on the inspector to make the bore measurements as accurately as possible and do so in the minimum time which is consistent with safety.

SUMMARY OF THE INVENTION

In general, a bore measuring apparatus made in accordance with the present invention has a housing which is axially insertable in a rotor bore, means for actually inserting the probe portion to the desired depth of insertion and securing the probe portion at the desired depth of insertion, and means for converting an axial movement signal supplied by the probe portion into a signal indicative of the bore's diameter. The probe portion includes a housing structure, a plurality of legs each of which is unconnected at one end and pivotally mounted to the housing structure at the other end, an axially displaceable actuating structure, a plurality of rigid linkage arms each of which is pivotally mounted at opposite ends on the actuating structure and a leg, means for actually displacing the actuating structure, and means for converting the actuating structure's axial movement into a signal indicative thereof.

The axial displacing means preferably comprises a two-way pneumatic cylinder having a piston structure which is axially displaceable in both directions. A scale or other measuring apparatus resides on the exterior of the housing structure to provide an indication of the axial depth of insertion of the probe portion. After inserting the probe portion, the desired distance into the rotor bore, the axial displacing means causes the actuating structure to move in the desired axial direction and induce the pivoting linkage arms to pivot the legs in the desired radial direction about their point of connection with the housing structure. During such radial displacement of the probe legs, the axial insertion means secures the probe portion at the desired depth of insertion and prevents movement thereof by axial forces induced by the pivoting of the legs. Such axial forces are minimal when the bore is straight, but for bores having a "bottle" profile in which the diameter changes over a predetermined axial distance, the legs and housing structure may be subjected to substantial axial forces induced by the pivoting of the legs into their bore wall engagement positions. Suitable relative sizing of the legs, linkage arms, and actuating structure in addition to the pivot position of the linkage arms on the legs allow bore diameter measurements for virtually any bore size and bore size variation occurring between selected axial locations. The collapsible and expandable nature of the probe legs permits probe portion insertion through a relatively small bore portion and expansion into engagement with the bore wall.

The unconnected ends of the probe legs preferably have spherical portions which are engageable with the bore wall. The shape of the spherical portions prevents the bore diameter measurement from being effected by the angle of the probe legs when they contact the bore wall. Measurement of rotor bore size at desired axial locations at periodic time intervals can provide early indications of impending failure such as by the creep mode. Early detection of such potential failure enables replacement and/or refurbishment of the utilizing device during routine maintenance so as to avoid unscheduled, costly shutdowns.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

The present invention is concerned with measuring bore diameters which change substantially between selected axial locations. Accordingly, in the description which follows, the invention is shown disposed in operating position in a large turbine rotor. It should be understood, however, that the invention may be utilized as a bore measuring apparatus in any member having bores with circular cross sections.

Figure 1:
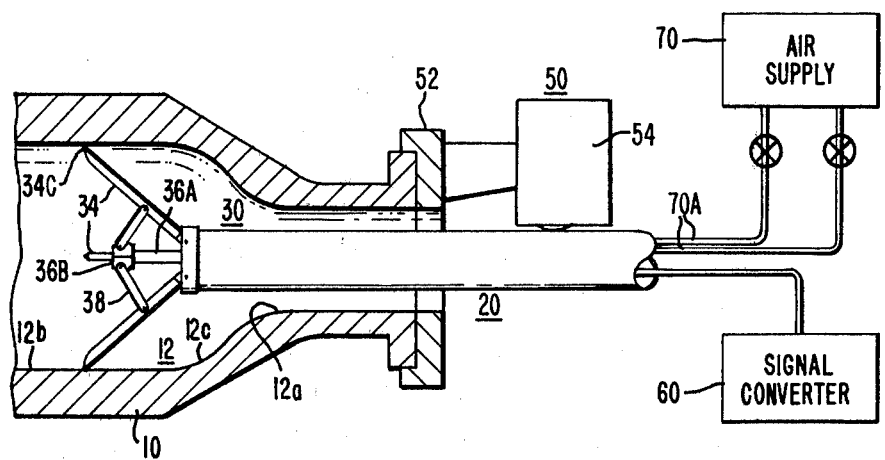
FIG. 1 is a partial transverse sectional view of a bottle bored rotor and the invention disposed in operating position therein.

In FIG. 1, the invention is shown disposed in operating position within rotor shaft 10. As can be seen from FIG. 1, circular bore 12 has a small diameter portion 12a, a large diameter portion 12b, and a transition portion 12c. The profile of bore 12 is referred to as a bottle bore due to its configuration and the gradual increase in size from small bore portion 12a through transition portion 12C to large bore portion 12b. Prior art measuring devices such as star gages had a maximum potential radial expansion of approximately 0.25 inches while some rotor's typical small and large bore diameter portions are on the order of four inches and eight inches, respectively. Such larger bore diameter portions are required for reasons such as removal of defects such as impurity inclusion in the rotor material. Such impurities can act as stress risers to adversely affect the life of the rotor. Transition portion 12C of bore 12 gradually increases from the small diameter portion 12a to large diameter portion 12B to avoid the effect of stress risers or concentrations which accompany most sharp corners or discontinuities.

It is necessary to measure the bore diameter at selected axial locations of rotor 10 upon manufacture and at periodic time intervals thereafter. The original, as-manufactured bore diameter at each desired axial location may be compared to the bore diameter at the same locations at later times after the rotor has been in service. Changes in the bore diameter at any axial location over the time interval can be an early sign of creep failure, among others.

When a steam turbine such as is used in central station electrical generating plants is removed from service for routine maintenance and inspection, it is highly desirable to minimize the downtime thereof since loss of revenue to the utility can run as high as $500,000 and more. As such, it is important to take bore diameter measurements accurately during such shutdowns to enable cognizant personnel sufficient information to make an intelligent decision regarding replacement of the rotor. However, it is also important to take these bore diameter measurements quickly so as to minimize the turbine's downtime. While a steam turbine is here utilized as an example, it is to be understood that other apparatus may also have circular bores which can effectively utilize such bore diameter measurement.

Measuring apparatus 20 comprises a probe portion 30 which is insertable in the rotor bore 12 and measures and transmits a signal indicative of the bore diameter, means 50 for axially inserting and securing probe portion 30 at the desired depth of insertion, and means 60 for converting the transmitted signal from probe portion 30 to an indication of the bore's diameter. Insertion means 50 includes chuck 52 which is securely fastened to rotor 10 and drive means 54 which engage probe portion 30 to axially drive probe portion 30 into bore 12, out of bore 12, or grasp securely in one axial position in bore 12. An example of such insertion means 50 is a Bug-O variable speed drive mechanism.

Figure 2B:
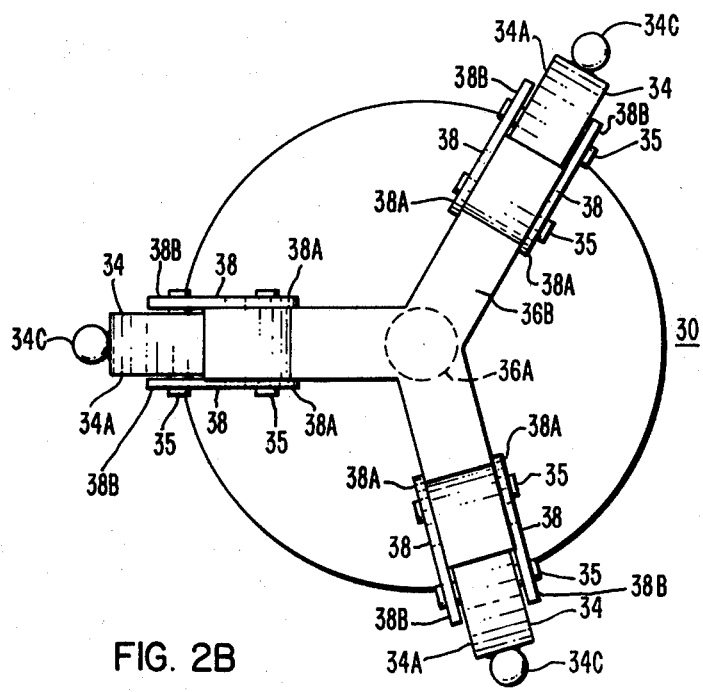
FIGS. 2A and 2B are partial transverse sectional and axial end views, respectively, of a portion of the present invention.
Figure 2A:
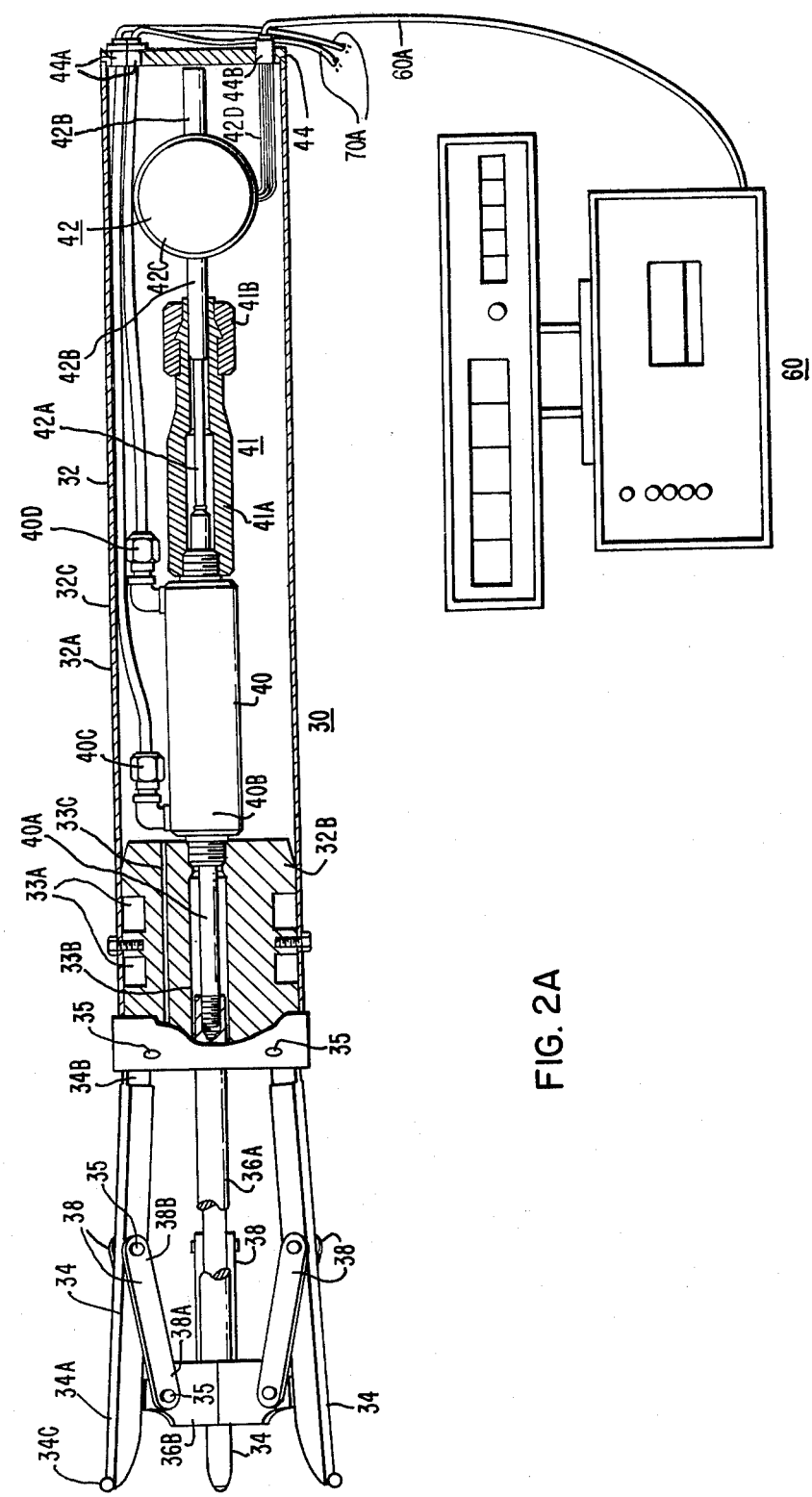

Enlarged partial transverse sectional and axial end views are respectively illustrated in FIGS. 2A and 2B. Probe portion 30 includes housing structure 32, a plurality (preferably 3) of legs 34, an axially displaceable actuating structure 36, a plurality of rigid linkage arms 38, means 40 for axially displacing actuating structure 36 in both axial directions, and means 42 for providing a signal indicative of the axial movement of the actuating structure 36. Housing structure 32 includes housing 32A and structural body 32B. Housing 32A is, by example, a three inch diameter tubular aluminum member and structural body 32B is a substantially solid piece of aluminum having openings 33A formed on its radially outer periphery to minimize the friction between structural body 32B and housing 32A when structural body 32B is fitted therein (preferably through the use of a force fit). Central opening 33B and air hole 33C both pass axially through structural body 32B to enable movement of actuating structure 36 and permit air circulation to the interior of housing 32A.

Legs 34 each have a free and restrained end 34A and 34B, respectively. The restrained end 34B of each leg 34 is pivotally mounted to housing structure 32 through the use of pin 35. Such pivotal mounting restricts the movement of legs 34 to the radial direction. Actuating structure 36 includes push rod portion 36A and yoke portion 36B. Actuating structure 36 is axially displaceable in both axial directions. A plurality (preferably 6) of rigid linkage arms 38 join yoke portion 36B and legs 34 and pivot relative to both yoke portions 36B and legs 34 about pins 35. Such dual pivotal motion of linkage arms 38 converts axial displacement of actuating structure 36 into radial movement of legs 34. Spherical portions 34C are disposed on each free end 34A of legs 34 to ensure engagement with the bore wall which is independent of the angle of legs 34. Suitable adjustment of the length of linkage arms 38, the length of legs 34, and the locations where pins 35 join linkage arms 38 to legs 34 enable construction of an apparatus capable of measuring widely varying bore diameters.

Actuating structure push rod 36A is threadably engaged with piston element 40A of axial displacing means 40. Such threaded engagement facilitates calibration of the legs' radial positions with the signal provided by axial movement indicator 42. As can be seen, stationary portion 40B of axial displacing means 40 is secured to housing structure 32 preferably through threaded engagement. Axial displacing means 40 preferably constitutes a two-way fluid cylinder such as a pneumatic cylinder. Air or other fluid supplied under pressure to inlet 40C drives piston element 40A to the right in FIG. 2A so as to draw actuating structure 36 to the right, rotate linkage arms 38 counterclockwise, and pivot free end 34A of legs 34 radially outward. Fluid under pressure supplied to fluid inlet 40D drives piston element 40A to the left, forces actuating structure 36 to the left, causes linkage arms 38 to rotate clockwise, and radially withdraws legs 34 toward the axial center line of bore 12.

Support structure 41 joins axial movement signal indicator means 42 to stationary portion 40B of axial displacing means 40. First portion 41A of support structure 41 is preferably threadably engaged with fluid cylinder stationary portion 40B while a second portion 41B is disposed about first portion 41A and engages first portion 41A to axial movement signal indicator 42 by functioning as a compression fitting. Sensor 42A is engaged with piston element 40A and moves in concert therewith. Sensor 42A is free to move axially relative to sensor guard 42B which protrudes on both axial sides of body portion 42C and functions to protect sensor 42A from oblique or radial forces. Axial movement signal indicator 42 is well known and is alternatively known as a linear probe gage, digital indicator, or rotary encoder. The signal, indicative of axial movement of actuating structure 36, is produced in body portion 42C and transmitted through electrical conductors 42D.

Cap 44 seals the end of housing 32A so as to obstruct foreign object entry and prevent damage to the components contained within housing 32A. Cap 44 includes fluid couplings 44A for the fluid supply and electrical connector 44B for transmitting the indicative signal. The fluid couplings 44A and electrical connector 44B facilitates connection and disconnection of fluid lines 70A which extend from air supply 70 as well as connection and disconnection of conductors 60A which extend from signal converter 60. Thus, probe portion 30 may be transported and assembled in bore 12 independently of moving signal converter 60 and air supply 70. Means 32C are provided on the exterior of housing 32A for indicating the axial depth of insertion of probe 30 into the bore. The axial insertion indicating means (not shown) are preferably painted or scribed into the outer surface of housing 32A. Thus, a profile of the bore may be developed by recording the bore diameter for various probe insertion distances.

Signal converter 60 preferably comprises a digital display-printer module with sequence counter-microprocessor. The signal provided by the axial movement indicator means 42 is input to signal converter 60 where a mathematical model of the linkage between legs 34, linkage arms 38, actuating structure 36, and axial displacing means 40 is programmed. The mathematical model of the aforementioned linkage allows the bore's diameter to be output and preferably printed by the printer module. Subsequent measurement of the bore diameter at the recorded axial insertion distances are compared with the bore diameters measured prior to putting the rotor 10 in service. Differences between bore diameters at the same insertion distance are noted and a determination is made as to the potential for rotor failure.

Legs 34 as best seen in FIG. 2B, are circumferentially equally spaced to provide means for centering the actuating structure 38 in the bore 12. The legs in the illustrated preferred embodiment are spaced apart 120 degrees. Furthermore, jointure of the legs 34 to a common actuating structure 36 ensures simultaneous and equal movement of the legs 34.

It will now be apparent that an improved bore measuring apparatus has been provided in which radial movement of probe legs is utilized to simultaneously center the measuring device and actuate the measuring device to provide an indication of the bore size. Bottle bores as well as straight bores may be measured with the aforementioned apparatus with a concomitant reduction in measurement time. By example, bore measurement time for a 200" axial length bore was reduced from approximately 10 hours to 1 hour. Even more dramatic measurement time reductions are attainable for increasing bore lengths.

We claim:

1. An apparatus for measuring the diameter of a rotor's cylindrical bore at any axial position, said apparatus comprising:
    a housing structure having means for indicating the axial depth of insertion of said housing in said bore,
    three legs each of which has a free and a restrained end, said restrained ends being circumferentially equally spaced and pivotally mounted to said housing structure, said pivotal mountings restricting said legs' movements to the radial direction, said legs' free ends being engageable with said bore's wall,
    a push rod having a yoke portion on one end thereof,
    a plurality of rigid linkage arms each of which has a first end pivotally mounted on said yoke and a second end pivotally mounted on a leg,
    a piston element joined to said push rod portion for axially displacing said push rod and yoke in both axial directions, said piston element being slidably disposed in a cylinder element which is attached to said housing structure,
    means for providing a signal indicative of the axial movement of said push rod;
    means joined to the rotor for axially inserting said housing structure a desired depth of insertion in the rotor bore and for preventing axial movement of said housing structure when said legs are pivoted into engagement with said bore wall; and
    means for converting said push rod's axial movement signal into a signal indicative of said legs' radial positions and said bore's diameter to accurately indicate said bore diameter and to accurately indicate the axial position of said indicated bore diameter.

2. The measuring apparatus of claim 1 wherein said legs' free ends have spherical portions which are engageable with said bore wall.

3. The measuring apparatus of claim 1 wherein said yoke is radially engageable with said legs when said legs are pivoted radially inwardly.

4. The measuring apparatus of claim 1 wherein said axial movement signal means is engaged with said axial displacing means so as to move in concert with said piston element.

5. The measuring apparatus of claim 1, wherein:
    said piston and cylinder elements form a double acting fluid cylinder.

6. The measuring apparatus of claim 1 wherein said piston element and said push rod portion are threadably engaged to provide means for adjusting their relative axial positions to facilitate calibration of the legs' radial positions with the signal provided by said axial movement indicator.

* * * * *